April 23, 1940.    W. N. BAGLEY    2,197,914
HOSE CONNECTION
Filed Nov. 3, 1937
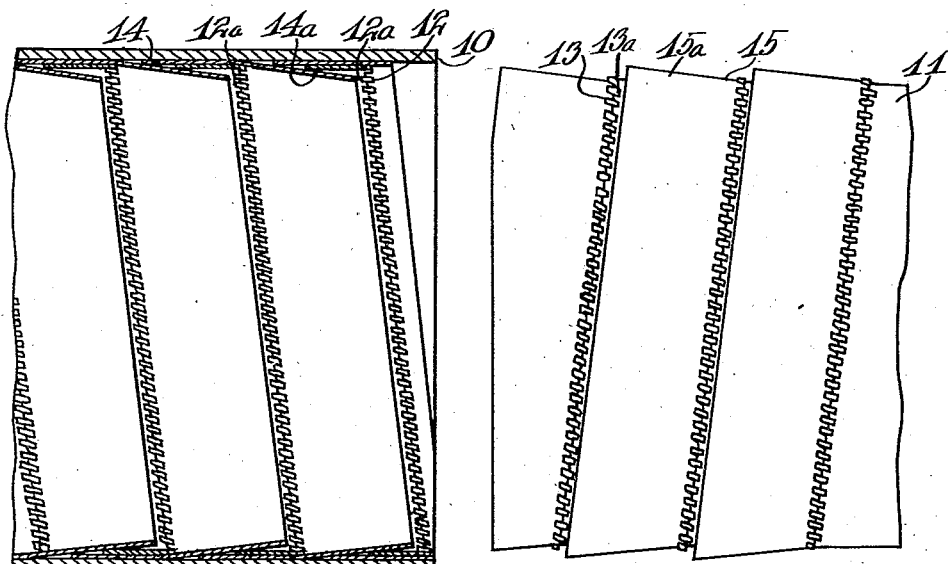
Fig. 1.    Fig. 1ª.
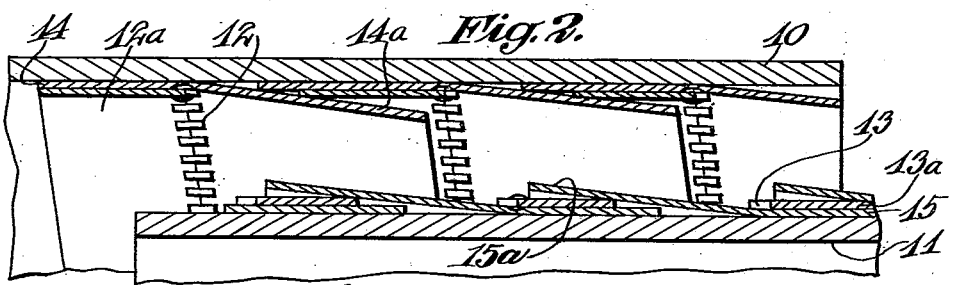
Fig. 2.
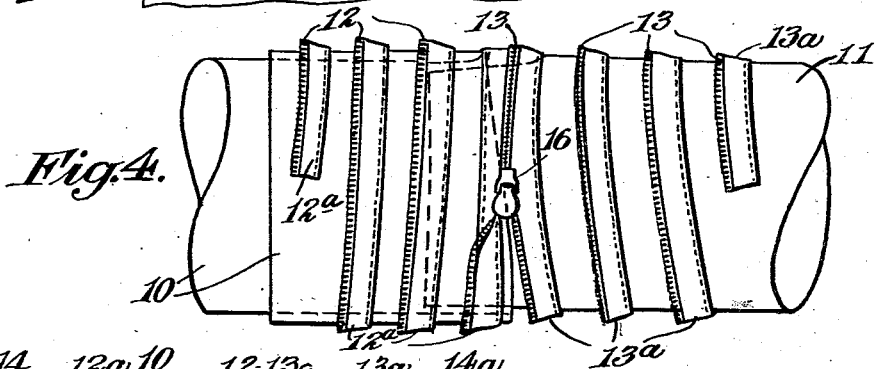
Fig. 4.
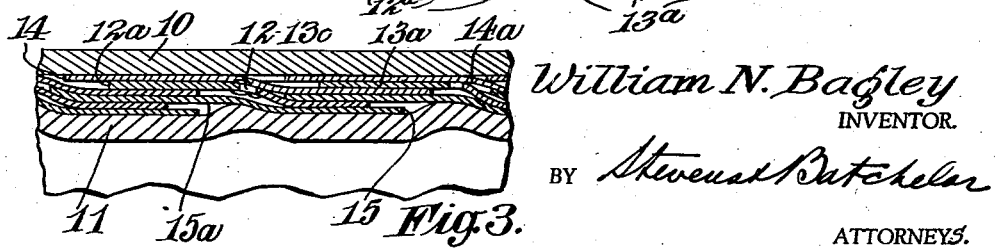
Fig. 3.
William N. Bagley
INVENTOR.
BY Stevens & Batcheler
ATTORNEYS.

ence to the accom-
panying drawing, in which—

UNITED STATES PATENT OFFICE

2,197,914

HOSE CONNECTION

William N. Bagley, Chicago, Ill.

Application November 3, 1937, Serial No. 172,646

6 Claims. (Cl. 285—71)

My invention relates to flexible conduits of the variety commonly called hose, and more particularly to the means and methods for joining sections of the same.

Usually, hose is preferred to pipe for conveying liquids where it is desirable that the conveying means be conveniently carried from place to place or compactly stored when it is no longer to be used. Thus, garden hose, fire hose and the like are wound on reels for handy transportation or compact storage. However, the amount of hose capable of being wound depends not only on its size but on the manner in which its sections are connected. While the hose itself becomes flatly wrapped when wound on a reel, the couplings or fittings joining these sections are bulky and prevent more than a limited length of the hose from being carried by each reel. Obviously, where the hose is of a larger capacity, such as may be desirable for land irrigation, it becomes highly impracticable to carry large couplings, owing to their bulk and form.

With the above situation considered, it is my main object to provide a connection for hose of any size which is capable of collapsing to the flat form of the hose as the latter is wound on a reel, whereby to enable a relatively long hose to be carried on one reel.

A further object of the invention is to provide a hose connection which enables the hose sections to be joined along a spiral course over an extensive area.

A still further object of the invention is to utilize the well known slide or zipper type of fastener in the novel type of connection.

An additional object of the invention is to provide means in the hose connection for the sealing of the same against leakage.

With the above objects in view and with any other that may suggest themselves from the description to follow, a better understanding of the invention may be had by reference to the accompanying drawing, in which—

Figs. 1 and 1a are views of two hose portions about to be assembled, the right-hand portion being in elevation and the left-hand one being in longitudinal section;

Fig. 2 is an enlarged fragment of the upper portion of Fig. 1, showing the hose constituents spacedly telescoped and in longitudinal section;

Fig. 3 is a fragment of the showing in Fig. 2, with the connection made; and

Fig. 4 is a diagrammatical elevation with the sealing flaps omitted, showing the manner in which one hose portion is manipulated for joining it to the other hose portion.

Primarily, the most substantial joint capable to be made between two portions of tubing or hose is by telescoping. This is precisely the basic form of my invention. However, I secure this kind of a joint by interposing a spiral fastening element between the telescoped hose portions, in order that these may be firmly secured. And further than this, I employ the popular slide fastener or zipper-type connection as the fastening element, so as to make it a simple matter to fasten or unfasten the joint by drawing the securing element around in one or the other direction in the manner of a thread.

Specific reference to the drawing indicates the outer hose portion at 10 and the inner one at 11. Commonly, the components of the slide fastener are carried by tapes, and the drawing shows the fastener components at 12 and 13, and the tapes carrying them at 12a and 13a.

For the purpose of my invention, a spiral length of the fastener-tape 12a is applied inside the hose portion 10, while a similar length of the fastener tape 13a is applied with the same pitch on the outer side of the hose portion 11. However, these tapes are not applied directly to the hose, but through the interposition of wider tapes or ribbons 14 and 15 of thin rubber, the tapes, rubber ribbons, and hose plies for each portion being stitched together in any suitable manner (not shown).

While the parts just described are firmly secured at points ahead of the fastener zone, the ribbons 14 and 15 also have sections 14a and 15a behind such zone which extend freely into the space between the telescoped hose portions.

In order that the portions of the hose may be joined, they must be arranged as in Fig. 4. It is here seen that the portion 11 is in the normal form, while the portion 10 has been folded back upon itself on the outside. The extent of this fold is to a point where the fastener spiral begins inside the portion 10. At this point the familiar key or talon 16 is applied to take hold jointly of the deepest part or extremity of the fastener component 12 and the foremost part of the fastener component 13. The key is then drawn forward along the spiral course, which action will serve to pull back the outside fold upon the inner hose portion 11, so that when the winding action is completed the portions will again be completely telescoped and the fastening therebetween secured along its entire extent.

The connection so far completed does not fortify the hose against leakage of its contents. It is for this purpose that the rubber ribbons 14 and 15 are provided. Thus, as the fastener is being joined in the spiral course, the free sections 14a and 15a of the rubber ribbons 14 and 15 will not only lie back toward their corresponding hose portions, creating a seal over the related fastener tapes 12a and 13a, but will also become closely laid upon each other. Now, where the fluid in the hose is under pressure—as is usually the case—the hose portion 11 will be dilated to press the components of the hose connection against the hose portion 10 whereby to hermetically seal the joint all along its spiral course.

It is just as well that the novel connection is not tightly sealed when the hose has been emptied of its contents, since it may then be desirable to separate its sections for transfer to another zone of activity. Thus, it is an easy matter to unwind the joint, so to speak, from the outer edge, folding back the portion 10 as the unwinding proceeds, the affected plies readily yielding to separation.

In conclusion, it will be evident that the novel hose connection is of a character to make the transfer and compact storage of hose of any size practicable, since the connection is of a character to be flattened so as to be compactly wound on a reel with the balance of the hose or so much of it as is carried on one reel. Thus, the hose or sections thereof can be readily laid and connected for use until a certain plan or system of operation is concluded, and then be quickly disconnected, loaded onto the reels and transported to another place for use over again. The application of the slide fastener in the spiral or threaded form renders the connection easily made or separated, and the peculiar arrangement of rubber plies makes the connection proof to leakage. Also, the winding of the fastener through a plurality of turns increases the area and strength of the joint.

While I have described the novel hose connection along specific lines, various minor changes or modifications may be made therein from time to time without departing from its principle, and I desire to consider all changes and refinements as coming within the scope and spirit of the appended claims.

I claim:

1. A hose connection comprising a pair of hose portions, said portions being adapted to be telescopically-assembled, cooperative slide fastener elements carried by each of the portions, said elements on each portion having a spiral course, and means movable in said course to unite said elements.

2. The structure of claim 1, and means between the portions to seal them against leakage when a fluid under pressure is contained in the hose.

3. The structure of claim 1, and fluid-sealing plies carried by each of the portions and overlapping to form a leak-proof connection when a fluid under pressure is contained in the hose.

4. The structure of claim 1, and plies carried by each of said portions and extending spirally alongside said elements, the plies overlapping and forming a leak-proof connection when fluid under pressure is contained in the hose.

5. The structure of claim 1, and plies attached to the contiguous surfaces of each of said portions and outwardly of said elements, said plies having free sections extending inwardly of the latter, the free sections of one hose portion overlapping those of the other and forming a leak-proof connection when a fluid under pressure is contained in the hose.

6. A hose connection comprising a pair of hose portions, said portions being adapted to be telescopically-assembled, cooperative slide fastener elements carried by each of the portions, means to unite such elements, separate sealing means associated with said fastener elements of each hose portion, said sealing means cooperating when said connection is completed to seal the same against leakage when fluid under pressure is contained in said hose.

WILLIAM N. BAGLEY.